United States Patent [19]

Hirose et al.

[11] Patent Number: 4,688,844
[45] Date of Patent: Aug. 25, 1987

[54] BACK DOOR STRUCTURES FOR MOTOR VEHICLES

[75] Inventors: Kazutaka Hirose; Hiroyuki Watanabe, both of Hiroshima, Japan

[73] Assignee: Mazda Motor Corporation, Hiroshima, Japan

[21] Appl. No.: 724,314

[22] Filed: Apr. 17, 1985

[30] Foreign Application Priority Data

| Apr. 18, 1984 [JP] | Japan | 59-77997 |
| Apr. 18, 1984 [JP] | Japan | 59-77998 |
| Apr. 18, 1984 [JP] | Japan | 59-77999 |

[51] Int. Cl.⁴ .................................. B62D 25/10
[52] U.S. Cl. ................................. 296/76; 296/51; 296/106; 49/163
[58] Field of Search ............. 296/51, 56, 76, 106, 296/146 (U.S. only); 49/163

[56] References Cited

U.S. PATENT DOCUMENTS

| 2,903,296 | 9/1959 | Barenyi | 296/146 |
| 2,959,448 | 11/1960 | Bogater et al. | 296/106 |
| 3,113,447 | 12/1963 | Olshei | 296/76 |
| 3,180,673 | 4/1965 | Wanlass | 296/106 |
| 3,216,760 | 11/1965 | Buchwald | 296/76 |
| 3,434,754 | 3/1969 | Scaglione | 296/76 |
| 3,612,601 | 10/1971 | Himka et al. | 296/51 |
| 3,713,472 | 1/1973 | Dozois | 296/56 |
| 3,716,945 | 2/1973 | Cooper et al. | 296/56 |
| 4,184,709 | 1/1980 | Kim | 296/146 |
| 4,413,854 | 11/1983 | Hirshberg | 296/76 |

FOREIGN PATENT DOCUMENTS

| 57-5212 | 2/1982 | Japan . |
| 57-143368 | 9/1982 | Japan . |

Primary Examiner—Robert B. Reeves
Assistant Examiner—Dennis H. Pedder
Attorney, Agent, or Firm—Fleit, Jacobson, Cohn & Price

[57] ABSTRACT

A vehicle body having a passenger compartment and a package compartment rearward of the passenger compartment. The passenger compartment has a rear end which is inclined rearwardly and downwardly. A rear window section is swingably mounted at its upper edge to the vehicle body to cover the rearwardly inclined rear end of the passenger compartment. A trunk lid section is swingably attached to the lower edge of the rear window section to cover the upper portion of the package compartment. Dampers are arranged between the body and the rear window section and the trunk lid section, respectively, to cause pivotal motion of the opened trunk lid section as the rear window section is opened.

4 Claims, 5 Drawing Figures

BACK DOOR STRUCTURES FOR MOTOR VEHICLES

BACKGROUND OF THE INVENTION

1. Field of the Invention

The present invention relates to back door structures for motor vehicles. More specifically, the present invention pertains to back door structures for vehicle bodies having rear window portions and rear trunk portions.

2. Description of the Prior Art

There are many types of motor vehicles which have rear body portions formed with rear door openings or trunk openings adapted to be closed by back doors or trunk lids. A typical example of such back door or trunk lid is disclosed by the Japanese Utility Model Application No. 56-28604 filed on Mar. 3, 1981 and disclosed for public inspection on Sept. 8, 1982 under the disclose No. 57-143368. In the structure disclosed by that utility model application, a trunk lid is provided rearward of a fixed rear window so that packages can be thrown into and taken out of the trunk room while the trunk lid is opened. Such conventional trunk structures are, however, inconvenient for use because the door openings are not sufficiently large for accommodations of large packages. In so-called hatch-back type vehicles, wide back door openings are provided. However, this type of vehicles is also inconvenient in that back doors of a relatively large size have to be opened even where packages are small.

Japanese Utility Model Publication No. 57-5212 published on Feb. 1, 1982 discloses a hatch-back type vehicle having an auxiliary door of a small size attached to the back door. According to the proposal in that utility model application, an auxiliary door opening is formed in the rear end portion of the back door and the auxiliary door is hinged to the back door to close the auxiliary door opening. It should however be noted that the auxiliary door opening in the proposed door structure is too small even for a small package so that it cannot improve the utility of the back door structure. Further, the proposed structure is inconvenient in that the back door and the auxiliary door have to be handled separately so that when the back door is opened with the auxiliary door open, the both doors must be closed separately.

OBJECTS OF THE INVENTION

It is therefore an object of the present invention to provide a vehicle back door structure which is convenient for use.

Another object of the present invention is to provide a vehicle back door structure having a pair of door sections which can be separately opened but can be closed simultaneously.

A further object of the present invention is to provide a vehicle back door structure having a pair of door sections provided with locking mechanisms.

Still a further object of the present invention is to provide a back door structure for a vehicle body having a rear window defining a rear end of a passenger compartment and a rear trunk room located rearward of the compartment.

SUMMARY OF THE INVENTION

According to the present invention, the above and other objects can be accomplished by a vehicle back door structure for a vehicle body including a passenger compartment and a package compartment located rearward of the passenger compartment, the back door structure comprising a back door opening formed in a rear portion of the vehicle body to extend from the rear end portion of the passenger compartment to at least an upper portion of the package compartment, a first door section swingably mounted at an upper edge on said vehicle body for movement between a closed position wherein it covers a part of the back door opening corresponding to the passenger compartment, and an open position wherein it opens the back door opening, a second door section having one edge attached to a lower edge of the first door section for swinging movement between an open position and a closed position wherein it covers the remaining part of the back door opening which corresponds to the upper portion of the package compartment.

According to a more specific feature, the vehicle back door structure in accordance with the present invention comprises a back door opening formed in a rear portion of a vehicle body and having upper and lower edges and two side edges, a first back door section having upper and lower edges and two side edges, said first back door section being mounted at the upper edge of the opening on the vehicle body for swinging movement between an open position and a closed position wherein the upper and both side edges of the first back door section extend respectively along the upper and both side edges of the back door opening so that the first back door section covers an upper part of the back door opening, a second back door section having one edge attached to the lower edge of the first back door section for swinging movement with respect thereto between a first position wherein it closes a lower part of the back door opening when the first back door section is in the closed position, and a second position wherein it opens the lower part of the back door opening when the first door section is in the closed position, means associated with the second back door section for moving the second back door section from the second position to the first position when the first back door section is moved to the open position while the second back door section is in the second position. The first back door section may be provided with one or more transparent portions so that it constitutes a rear window of the vehicle body. Locking means may be provided between the first and second back door sections to maintain the second back door section in the first position.

The above and other features of the present invention will become apparent from the following descriptions of preferred embodiments, taking reference to the accompanying drawings.

DESCRIPTION OF THE PREFERRED EMBODIMENTS

Figure 1:
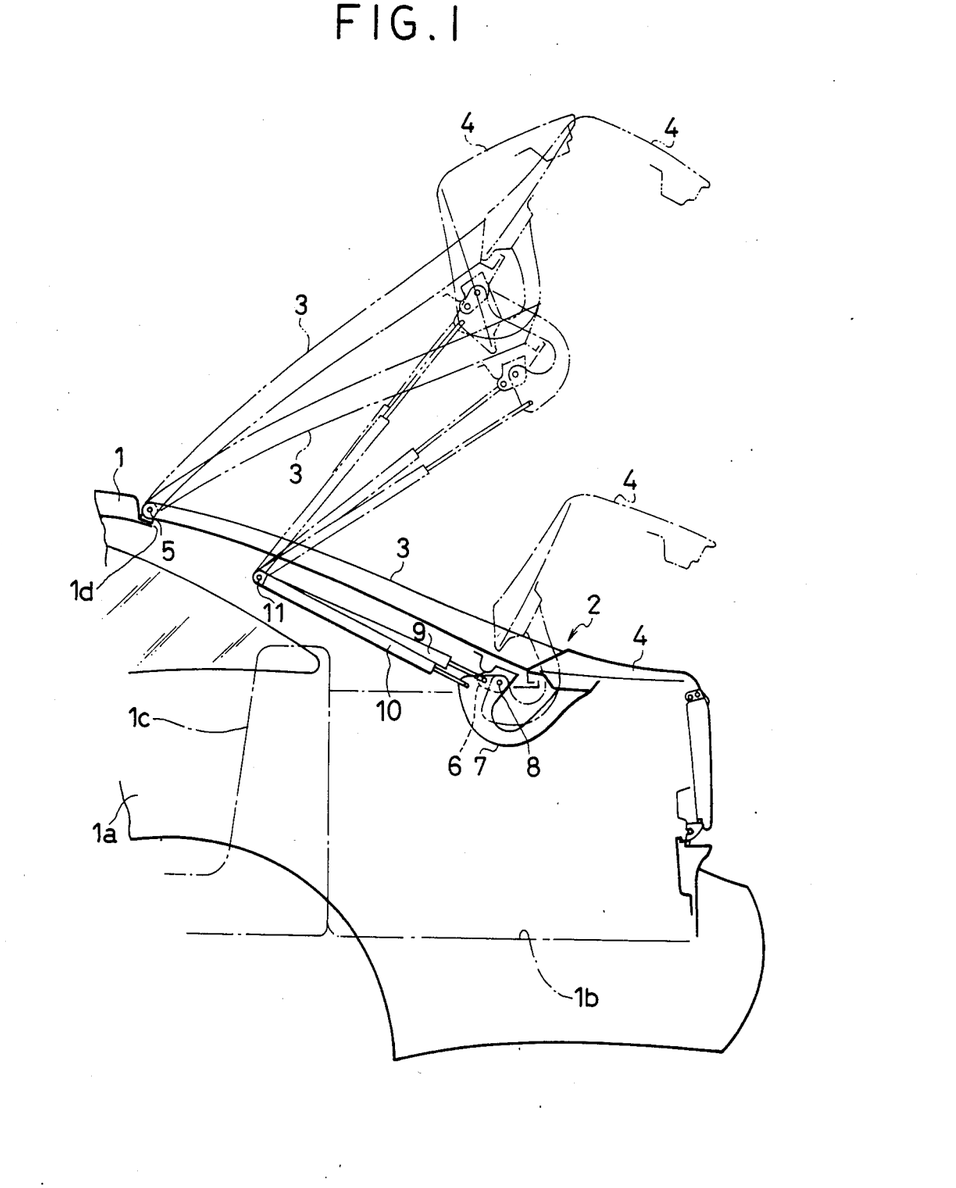
FIG. 1 is a fragmentary sectional view of a vehicle rear body showing a back door structure in accordance with one embodiment of the present invention.

Referring to the drawings, and particularly to FIG. 1, there is shown a vehicle body 1 formed with a passenger compartment 1a and a package compartment 1b rearward of the passenger compartment 1a. The passenger compartment 1a has a rear end which is inclined rearwardly and downwardly. The package compartment 1b has an upper portion and a substantially horizontal top at the rear portion. At the rear end portion of the passenger compartment 1a, there is provided a rear seat 1c as is well known in the art. The vehicle body 1 is further formed at the rear end portion with a back door opening 1d which includes upper and lower edges and two side edges, and which extends from the rear end of the passenger compartment 1a to the upper and rear portions of the package compartment 1b. In the back door opening 1d, there is provided a back door assembly 2.

The back door assembly 2 includes a rear window section 3 and a trunk lid section 4. The rear window section 3 has a transparent window glass 3a (see FIG. 2) and is mounted at the upper edge to the upper edge of the back door opening 1d by means of hinge mechanisms 5 so that the section 3 can be swung upward as shown by phantom lines in FIGS. 1 and 2. The rear window section 3 is located so that it covers the upper portion of the back door opening 1d, which corresponds to the rear end portion of the passenger compartment 1a when the window section is in the closed position shown by the solid lines. The rear window section 3 is provided at the inner side of the lower portion with a pair of brackets 6, one at each side of the window section 3. There is a damper 9 provided at each side of the rear window section 3 and it has one end pivotably connected with the body 1 and the other end pivotably connected with the bracket 6. The damper 9 is of a known structure which is longitudinally extensible and provides a frictional resistance so that it can hold the rear window section 3 at any position, including a fully opened position and any partially opened position.

The trunk lid section 4 has a front edge portion provided at each side with a bracket 7 of a substantially J-shaped configuration. The bracket 7 is pivotably connected at one end by a pin 8 with the bracket 6, the other end being secured to the inner side of the trunk lid section 4. A damper 10 is provided and has one end pivotably connected with the vehicle body 1 and the other end connected with an intermediate portion of the bracket 7. The trunk lid section 4 is therefore swingable with respect to the rear window section 3 about the pivot pin 8 between the position shown by solid lines and the position shown by phantom lines. In the position shown by the solid lines, the trunk lid section 4 covers the lower portion of the back door opening 1d corresponding to the upper and rear end portions of the package compartment 1b. The damper 10 has the same structure as the damper 9 so that it can hold the trunk lid section 4 at any position.

The damper 10 has an effective stroke smaller than that of the damper 9 so that, when the rear window section 3 is moved to an open position while the trunk lid section 4 is in the open position shown by phantom lines in FIG. 1, the damper 10 bottoms earlier than the damper 9 does. Therefore, the bracket 7 and the trunk lid section 4 connected thereto are forced to swing clockwise about the pivot pin 8 when the rear window section 3 is moved further to the open position after the damper 10 has bottomed to take a closed position with respect to section 3. It is therefore possible to bring the both sections 3 and 4 simultaneously to the closed positions.

The back door structure described above can be used in a conventional manner by swinging the trunk lid section 4 between the open and closed positions. Then, the structure functions as a conventional trunk lid in a conventional passenger car. When it is desired to open the package compartment wide, the trunk lid section 4 is moved together with the rear window section 3 to the open position so that the package compartment 1b can be fully opened.

Figure 2:
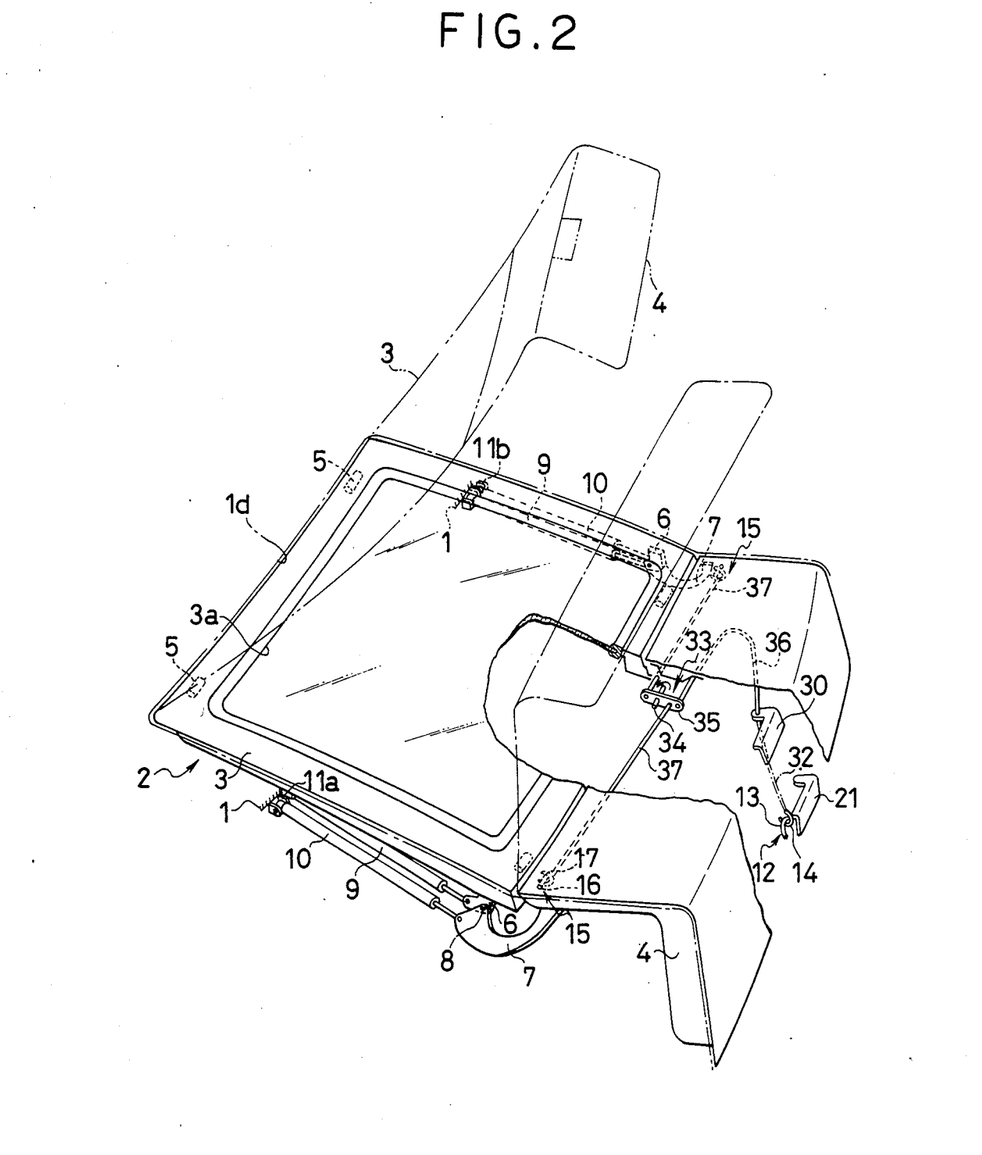
FIG. 2 is a perspective view of the back door structure of FIG. 1.
Figure 3:
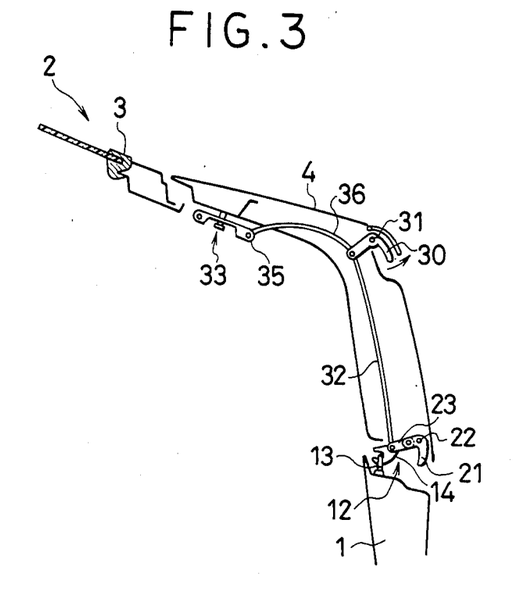
FIG. 3 is a partial sectional view showing the locking mechanisms employed in the back door structure of FIG. 1.
Figures 3A, 3B, 3C, 3D:
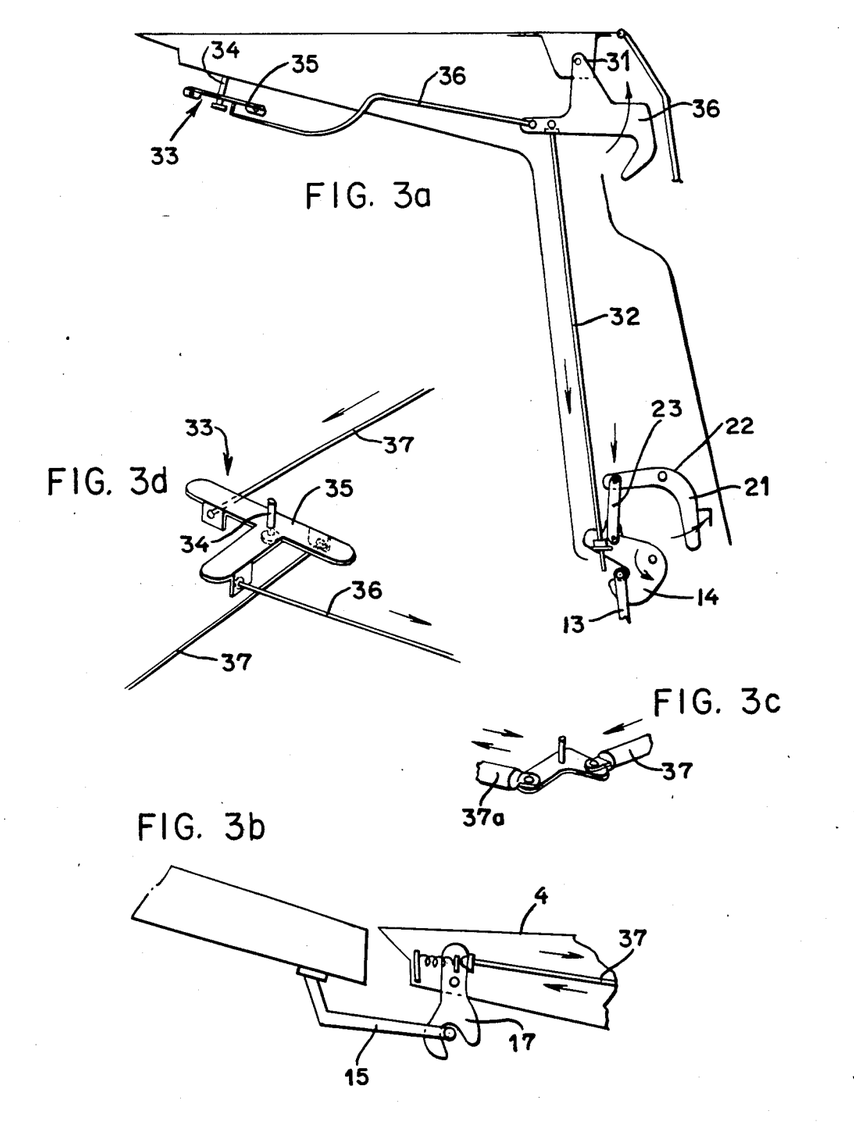

Referring to FIGS. 2 and 3, it will be noted that the trunk lid section 4 is provided at a lower end portion with a first locking mechanism 12 for locking the trunk lid section 4 to the vehicle body 1. The first locking mechanism 12 includes a loop 13 secured to the vehicle body 1 and a hook 14 pivotably mounted on the lower end portion of the trunk lid section 4 for releasable engagement with the loop 13. There is also provided a second locking mechanism 15 between the sections 3 and 4 so as to lock the trunk lid section 4 against movement with respect to the rear window section 3. The second locking mechanism 15 includes a loop 16 secured to the section 3 and a hook 17 pivotably mounted on the front edge portion of the section 4 for releasable engagement with the loop 16.

The hooks 14 and 17 are spring biased toward engaging positions with the loops 13 and 16, respectively. It will therefore be understood that the locking mechanisms 12 and 15 serve to lock the sections 3 and 4 in closed positions. The trunk lid section 4 is provided at the outer side of the rear portion with a first unlocking member 21 which is mounted pivotally on the section 4 by means of a pin 22. The unlocking member 21 has a crank arm which is connected through a link 23 with the hook 14 so that an actuation of the unlocking member 21 causes a pivotal movement of the hook 14 against the biasing force of the spring toward a release position.

There is also provided on the trunk lid section 4 a second unlocking member 30 which is pivotably mounted on the section 4 by a pin 31. The unlocking member 30 has a crank arm connected through a rod 32 with the hook 14 of the first locking mechanism 12 so that an actuation of the unlocking member 30 causes a movement of the hook 14 toward the release position. The second unlocking member 30 is also connected through an unlocking mechanism 33 with the second locking mechanism 15. The mechanism 33 includes a link 35 pivotably mounted on the trunk lid section 4 through a pin 34. The link 35 is connected at one end through a cable 36 with the crank arm of the second unlock member 30 so that an actuation of the member 30 causes a pivotal movement of the link 35 in the direction shown by an arrow in FIG. 2. The link 35 is also connected with unlocking rods 37 which are connected with the hooks 17 of the second locking mechanisms 15 at the respective sides of the trunk lid section 4. The unlocking rods 37 function to transmit the movement of the link 35 to the hooks 17 so as to move the hooks 17 to the release positions. It will therefore be understood that actuation of the second unlocking member 30 unlocks the first and second locking mechanisms 12 and 15 simultaneously, so that the trunk lid section 4 can be opened independently from the rear window section 3.

Figure 4:
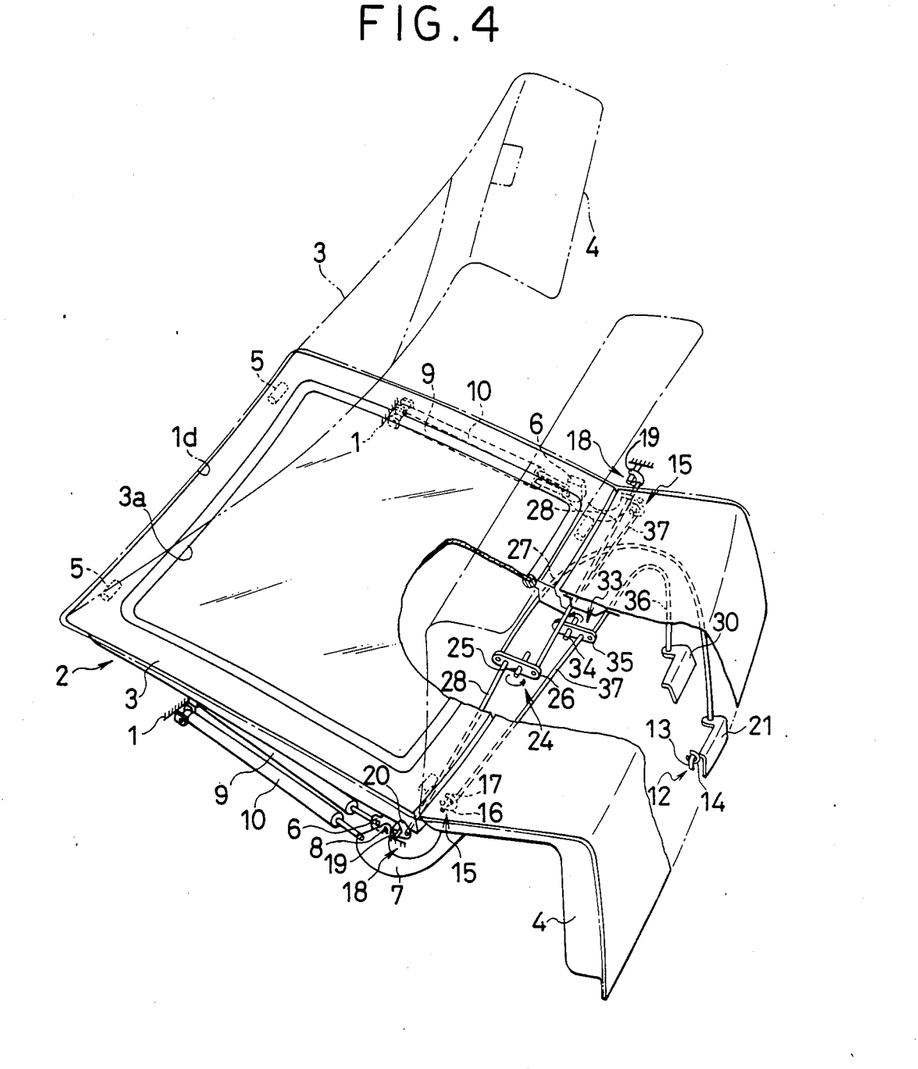
FIG. 4 is a perspective view similar to FIG. 2 but showing another embodiment.
Figure 5:
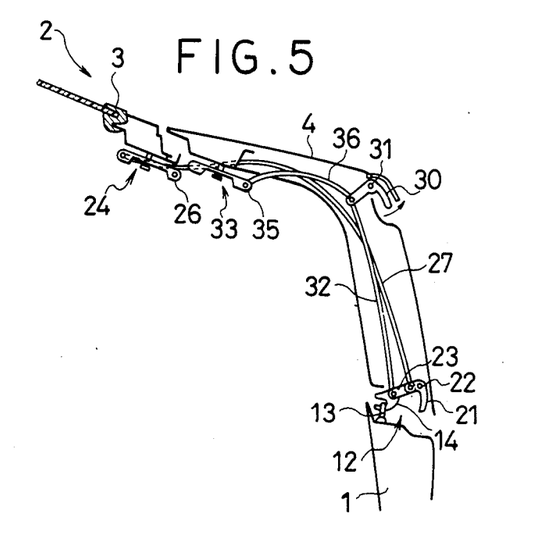
FIG. 5 is a partial sectional view showing the locking mechanisms employed in the embodiment shown in FIG. 4.
Figure 5A:
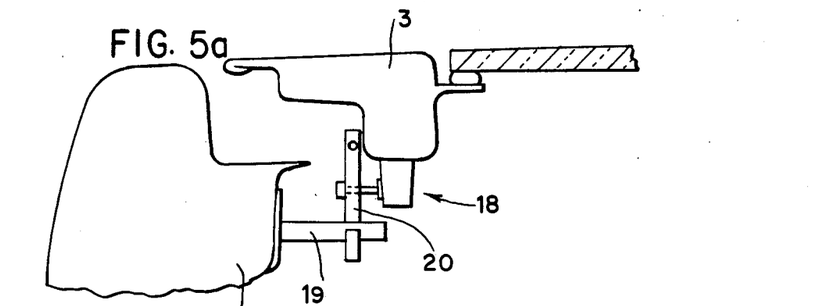
Figure 5B:
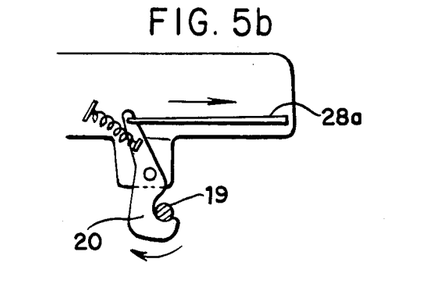
Figure 5C:
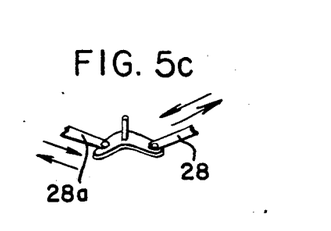
Figure 5D:
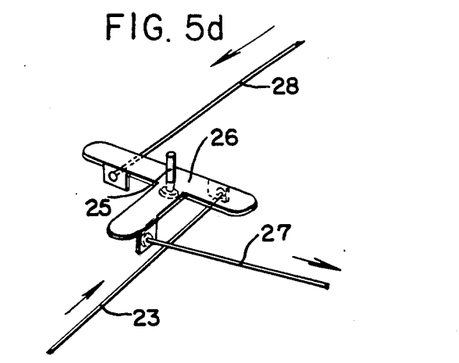

Referring now to FIGS. 4 and 5, the embodiment shown therein further includes a third locking mechanism 18 provided at each side of the rear window section 3 in addition to the first and second locking mechanisms 12 and 15, which are identical to those employed in the previous embodiment. The third locking mechanism 18 includes a pin 19 secured to the vehicle body 1 and a hook 20 pivotably mounted on the rear window section 3 for releasable engagement with the pin 19. The hook 20 is spring biased into the engaging position. There is provided a second unlocking mechanism 24 which is structurally similar to unlocking mechanism 33 and includes a link 26 pivotably mounted on the trunk lid section 4 by means of a pin 25. The link 26 is connected at one end through a cable 27 with the crank arm of the first unlocking member 21 so that the link 26 is swung in the direction shown by an arrow in FIG. 4 when the first unlocking member 21 is actuated. The link 26 is also connected with unlocking rods 28, which are in turn connected with the hooks 20 of the third locking mechanisms 18 at the respective sides of the rear window section 3. The movement in the direction of the arrow of the link 26 is thus transmitted through the unlocking rods 28 to the hooks 20 to thereby move the hooks 20 to the release positions. It will therefore be understood that an actuation of the first unlocking member 21 causes unlocking movements of the first and third locking mechanisms 12 and 18 maintaining the second locking mechanism 15 in the locking position. It is therefore possible to open the rear window section 3 together with the trunk lid section 4. When the second unlocking member 30 is actuated, however, the first and second locking mechanisms 12 and 15 are unlocked, whereas the third locking mechanism 18 is maintained in the locking position. Thus, the trunk lid section 4 can be opened independently from the rear window section 3.

The invention has thus been shown and described with reference to specific embodiments, however, it should be noted that the invention is in no way limited to the details of the illustrated structures, but changes and modifications may be made without departing from the appended claims.

We claim:

1. A vehicle back door structure for a vehicle body including a passenger compartment and a package compartment located rearward of the passenger compartment, the back door structure comprising a back door opening formed in a rear portion of the vehicle body to extend from a rear end portion of the passenger compartment to at least an upper portion of the package compartment, a first door section swingably mounted at an upper edge on said vehicle body for movement between a closed position wherein it covers a first part of the back door opening and an open position wherein it opens the first part of the back door opening, a second door section having a surface, one edge of said surface pivotally attached to a lower edge of the first door section for swinging movement between an open position wherein said surface of the second door section is angularly located with respect to the first door section so that the second door section opens a second part of the back door opening situated at the upper portion of the package compartment when said first door section is in the closed position, and a closed position wherein said surface of said second door section forms a substantially continuous extension of the first door section so that said second door section covers said second part of the back door opening when said first door section is in the closed position, and actuating means extending from the vehicle body and connected with the second door section for moving the second door section from the angularly located position with respect to the first door section to the position in which said surface of said second door section forms a substantially continuous extension of the first door section when the first door section is moved from its closed position to its open position.

2. A vehicle back door structure comprising a back door opening formed in a rear portion of a vehicle body and having upper and lower edges and two side edges, a first back door section having upper and lower edges and two side edges, said first back door section being pivotally mounted at the upper edge of the back door opening on the vehicle body for swinging movement between an open position and a closed position, wherein the upper and both side edges of the first back door section extend respectively along the upper and both side edges of the back door opening so that the first back door section covers a first part of the back door opening, a second back door section having a surface, one edge of said surface pivotally attached to the lower edge of the first back door section for swinging movement with respect to said first back door section lower edge between a first position and a second position with respect to the first back door section wherein when the first back door section is in the closed position said first position of said second back door section closes a second part of the back door opening and said second position of said second back door section opens the second part of the back door opening, and actuating means extending from the vehicle body and connected with the second back door section for moving the second back door section from the second position to the first position when the first back door section is moved to the open position.

3. A vehicle back door structure for a vehicle body including a passenger compartment having a rear end inclined rearwardly and downwardly and a package compartment located rearward of the passenger compartment, the back door structure comprising a back door opening formed in a rear portion of the vehicle body to extend along the rear end of the passenger compartment and at least an upper portion of the package compartment, a first back door section having an upper edge swingably hinged to an upper edge of the back door opening for movement between a closed position and an open position, the first back door section extending rearwardly and downwardly along an upper portion of the back door opening to close a first portion of said back door opening when said first back door section is in said closed position, a second back door section having a forward edge swingably hinged to said first back door section for movement between a first position and a second position with respect to the first back door section, said second back door section having a portion which extends substantially horizontally in said first position to close a second portion of said back door opening extending along the upper portion of the package compartment when the first back door section is in the closed position, said second back door section swingable to said second position to open the second portion of said back door opening when the first back door section is in the closed position, and actuating means extending from the vehicle body and connected with the second back door section for moving the second back door section with respect to the first back door section from the second position to the first position when the first back door section is moved to its open position.

4. A vehicle back door structure in accordance with claim 3 in which said first back door section has a transparent portion to constitute a rear window of the passenger compartment.

* * * * *